US008894748B2

(12) United States Patent
Ghosh et al.

(10) Patent No.: US 8,894,748 B2
(45) Date of Patent: Nov. 25, 2014

(54) SYSTEMS AND METHODS FOR REMOVING PARTICULATE MATTER FROM A GAS STREAM

(71) Applicant: Alcoa Inc., Pittsburgh, PA (US)

(72) Inventors: Rajat S. Ghosh, Murrysville, PA (US); Neal Richard Dando, Murrysville, PA (US); Jay N. Bruggeman, North Charleston, SC (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

(21) Appl. No.: 13/829,449

(22) Filed: Mar. 14, 2013

(65) Prior Publication Data
US 2014/0053731 A1 Feb. 27, 2014

Related U.S. Application Data

(60) Provisional application No. 61/691,649, filed on Aug. 21, 2012.

(51) Int. Cl.
*B01D 47/00* (2006.01)
*B01D 53/14* (2006.01)
*B01D 47/06* (2006.01)
(52) U.S. Cl.
CPC ..................... *B01D 47/06* (2013.01)
USPC ............... 95/230; 95/237; 95/149; 95/214; 96/243; 96/267; 96/271; 96/355
(58) Field of Classification Search
None
See application file for complete search history.

(56) References Cited

U.S. PATENT DOCUMENTS

| | | | | |
|---|---|---|---|---|
| 3,617,212 | A | | 11/1971 | Shah .............................. 423/522 |
| 3,653,823 | A | | 4/1972 | Shah ........................ 423/243.09 |
| 3,948,608 | A | * | 4/1976 | Weir, Jr. ......................... 422/169 |
| 3,957,464 | A | * | 5/1976 | Teller ............................... 95/196 |
| 3,969,482 | A | | 7/1976 | Teller ............................ 423/235 |
| 4,049,399 | A | * | 9/1977 | Teller ............................... 95/36 |
| 4,067,703 | A | * | 1/1978 | Dullien et al. .................. 95/218 |
| 4,269,812 | A | | 5/1981 | Edwards et al. .......... 423/243.09 |

(Continued)

FOREIGN PATENT DOCUMENTS

| | | | |
|---|---|---|---|
| EP | 0613713 | 9/1994 | ........................ 53/34 |
| WO | WO 2006/104304 | 10/2006 | ........................ 53/78 |
| WO | WO2007/096492 | 8/2007 | |

OTHER PUBLICATIONS

Chang et al., *SO₂Removal by Limestone Dual Alkali*, Environmental Progress, vol. 3, No. 4, pp, 267-274, (1984).

(Continued)

*Primary Examiner* — Frank Lawrence, Jr.
*Assistant Examiner* — Pankti Patel
(74) *Attorney, Agent, or Firm* — Greenberg Traurig, LLP

(57) ABSTRACT

Horizontal duct scrubbing systems for removing particulate matter from a gas are disclosed. The horizontal scrubbing systems may receive a particulate-containing gas stream (e.g., containing PM10 and/or PM2.5 particulate matter), and remove at least some of such particulates by spraying liquid droplets co-current to the flow of the gas stream, where the liquid droplets have a volume median droplet diameter (DV0.5) of from 240 microns to 600 microns. The scrubbing system may be substantially free of flow deflection members between a liquid inlet manifold and a demister. The system may be remove at least 50 wt. % PM10 and/or PM2.5 particulate matter from the gas stream.

20 Claims, 4 Drawing Sheets

(56) References Cited

U.S. PATENT DOCUMENTS

| | | | | |
|---|---|---|---|---|
| 4,305,737 | A | 12/1981 | Laliwala | 96/259 |
| 4,343,771 | A | 8/1982 | Edwards et al. | 422/168 |
| 4,374,813 | A * | 2/1983 | Chen et al. | 423/243.08 |
| 4,462,969 | A | 7/1984 | Wilhelm | 423/242 |
| 4,865,817 | A * | 9/1989 | Burgess et al. | 422/168 |
| 4,976,937 | A | 12/1990 | Lee | 423/243.09 |
| 5,039,315 | A * | 8/1991 | Liao et al. | 95/214 |
| 5,266,285 | A | 11/1993 | Glancy et al. | 423/243.09 |
| 5,403,568 | A | 4/1995 | Stowe, Jr. | 423/243.08 |
| 5,439,509 | A * | 8/1995 | Spink et al. | 95/166 |
| 5,486,341 | A | 1/1996 | Bresowar | 423/243.01 |
| 5,582,807 | A * | 12/1996 | Liao et al. | 423/210 |
| 5,662,721 | A | 9/1997 | Bresowar | 55/257 |
| 5,759,233 | A * | 6/1998 | Schwab | 95/8 |
| 6,063,352 | A | 5/2000 | Risse et al. | 423/243.06 |
| 6,399,030 | B1 | 6/2002 | Nolan | 422/172 |
| 6,562,304 | B1 | 5/2003 | Mizrahi | 422/171 |
| 6,964,699 | B1 | 11/2005 | Carns et al. | 96/361 |
| 6,984,368 | B2 | 1/2006 | Hajjatie et al. | 423/514 |
| 7,645,430 | B2 | 1/2010 | Ghosh et al. | 423/210 |
| 7,906,089 | B2 | 3/2011 | Ghosh et al. | 423/210 |
| 7,931,737 | B2 | 4/2011 | Dando | 59/131 |
| 8,137,649 | B2 | 3/2012 | Ghosh et al. | 423/210 |
| 2002/0110511 | A1 | 8/2002 | Klingspor et al. | 423/243.08 |
| 2004/0079235 | A1 | 4/2004 | Vrotsos | 96/299 |
| 2008/0050298 | A1 | 2/2008 | Meyden et al. | 423/240 |
| 2009/0188782 | A1 * | 7/2009 | Genuario et al. | 204/157.3 |
| 2010/0175552 | A1 * | 7/2010 | Ghosh et al. | 95/23 |
| 2010/0229725 | A1 * | 9/2010 | Farsad et al. | 96/74 |

OTHER PUBLICATIONS

Lunt et al., *Adaptation of Dilute Mode Lime Dual Alkali Scrubbing at Stillwater Mining Company PGM Smelter*, Hydrometallurgy 2003—Fifth International Conference, vol. 2, pp. 1729-1739, (2003).

Medellin et al., *Removal of $SO_2$ and $NO_x$ from Simulated Flue Gases by Alkalized Alumina in a Radial Flow Fixed Bed*, Ind. Eng. Chem. Process Des. Dev., vol. 17, No. 4, (1978).

International Search Report and Written Opinion from co-owned International Application No. PCT/US2013/055580, mailed Dec. 6, 2013.

* cited by examiner

Particulate Capture Performance Tests

| Run No. | Gas Velocity Scrubber (fps) | Volume Flow Scrubber (acfm) | L/G Ratio | Scrubber Liquid Flow (gpm) | Inlet Temp (°F) | Flue Gas Inlet Temp (°F) | Outlet Temp (°F) | B.E.T.E Nozzle Type | Spray Angle | No. of Nozzles | Nozzle Pressure (psig) | DV0.5 Per BETE Specs (microns) |
|---|---|---|---|---|---|---|---|---|---|---|---|---|
| A(r) | 35.4 | 10739 | 10.9 | 117 | 40.0 | 255 | 72.5 | TF16 | 90° | 9 | 59.9 | 320 |
| B | 35.5 | 10790 | 14.7 | 159 | 40.5 | 251 | 69.8 | TF20 | 90° | 9 | 45.8 | 360 |
| C | 25.1 | 7621 | 15.0 | 114 | 40.0 | 255 | 68.0 | TF16 | 90° | 9 | 56.8 | 320 |
| D | 25.5 | 7758 | 19.6 | 152 | 40.0 | 255 | 68.0 | TF20 | 90° | 9 | 41.9 | 390 |

| Run No. | Particulate Type | Target Inlet Particulate Loading (gr/dscf) | Actual Inlet Particulate Loading (gr/dscf) | Total Particulate INLET (lbs/hr) | Total Particulate OUTLET (lbs/hr) | Removal Efficiency wt. % | Between 10 & 30 micron INLET (lbs/hr) | OUTLET (lbs/hr) | Removal Efficiency wt. % | Between 2.5 & 10 micron INLET (lbs/hr) | OUTLET (lbs/hr) | Removal Efficiency wt. % | PM 2.5 INLET (lbs/hr) | OUTLET (lbs/hr) | Removal Efficiency wt. % | PM10 INLET (lbs/hr) | OUTLET (lbs/hr) | Removal Efficiency wt. % |
|---|---|---|---|---|---|---|---|---|---|---|---|---|---|---|---|---|---|---|
| A(r) | MICROTALC | 0.04 | 0.0413 | 4.2111 | 0.2393 | 94.32% | 2.0495 | 0.0919 | 95.52% | 2.0566 | 0.1192 | 94.20% | 0.1050 | 0.0282 | 73.14% | 2.1616 | 0.1474 | 93.18% |
| B | MICROTALC | 0.04 | 0.0391 | 4.0258 | 0.3538 | 91.21% | 1.9717 | 0.0976 | 95.05% | 2.0057 | 0.2386 | 88.10% | 0.0484 | 0.0175 | 63.84% | 2.0541 | 0.2561 | 87.53% |
| C | MICROTALC | 0.04 | 0.0372 | 2.7589 | 0.1869 | 93.23% | 1.6058 | 0.0584 | 96.37% | 1.1074 | 0.0802 | 92.76% | 0.0457 | 0.0 | n.d. | 1.1531 | 0.08015 | 93.05% |
| D | MICROTALC | 0.04 | 0.0393 | 2.9318 | 0.2288 | 92.20% | 1.6311 | 0.0936 | 94.26% | 1.2332 | 0.1378 | 88.83% | 0.0675 | 0.0 | n.d. | 1.3007 | 0.1378 | 89.41% |

| Run No. | Total Particulate INLET (gr/dscf) | OUTLET (gr/dscf) | Between 10 & 30 micron INLET (gr/dscf) | OUTLET (gr/dscf) | Between 2.5 & 10 micron INLET (gr/dscf) | OUTLET (gr/dscf) | PM 2.5 INLET (gr/dscf) | OUTLET (gr/dscf) | PM10 INLET (gr/dscf) | OUTLET (gr/dscf) |
|---|---|---|---|---|---|---|---|---|---|---|
| A(r) | 0.0413 | 0.0024 | 0.0201 | 0.0009 | 0.0202 | 0.0012 | 0.0010 | 0.0003 | 0.0212 | 0.0015 |
| B | 0.0391 | 0.0030 | 0.0191 | 0.0009 | 0.0195 | 0.0023 | 0.0005 | 0.0001 | 0.0200 | 0.0024 |
| C | 0.0372 | 0.0027 | 0.0216 | 0.0009 | 0.0149 | 0.0012 | 0.0006 | n.d. | 0.0155 | 0.0012 |
| D | 0.0393 | 0.0033 | 0.0219 | 0.0013 | 0.0165 | 0.0019 | 0.0009 | n.d. | 0.0174 | 0.0019 |

SYSTEMS AND METHODS FOR REMOVING PARTICULATE MATTER FROM A GAS STREAM

CROSS-REFERENCE TO RELATED APPLICATION

This patent application claims priority to U.S. provisional patent application No. 61/691,649, entitled "SYSTEMS AND METHODS FOR REMOVING PARTICULATE MATTER FROM A GAS STREAM", which is incorporated herein by reference in its entirety.

BACKGROUND

The United States Environmental Protection Agency ("EPA") regulates particulate matter air pollution in the United States. More specifically, the EPA sets air quality standards regarding two size categories of particulate matter, PM10 and PM2.5 (40 CFR §§50.6 and 50.7). Compliance with these (and other) EPA air quality standards may require removal of at least some PM10 and/or PM2.5 particulate matter from a gas stream.

SUMMARY OF THE DISCLOSURE

Broadly, the present disclosure relates to horizontal particulate matter scrubbers for removing particulate matter from gases, and systems and methods relating to the same. The scrubbers are generally substantially free of flow deflection members between a liquid inlet manifold and a demister downstream of the liquid inlet manifold.

In one aspect, a horizontal duct scrubbing system for removing particulate matter from a gas stream includes a horizontally disposed housing, a liquid inlet manifold disposed within the horizontally disposed housing, and a demister disposed within the housing, where the horizontally disposed housing is substantially free of flow deflection members between the liquid inlet manifold and the demister. The housing includes a waste gas inlet for receiving a particulate-containing gas stream and a treated gas outlet for discharging a treated gas stream. The demister may be located proximal the treated gas outlet.

The liquid inlet manifold may include a plurality of nozzles oriented to spray liquid droplets co-current to the flow of a particulate-containing gas stream flowing through the horizontally disposed housing. In this regard, the liquid inlet manifold is adapted to supply a liquid to the plurality of nozzles, and each of the plurality of nozzles are adapted to produce liquid droplets from the liquid, where the produced liquid droplets have a volume median droplet diameter (DV0.5) of from 240 microns to 600 microns.

In one embodiment, the incoming particulate-containing gas stream has a concentration of at least 0.7 mg/m$^3$ of PM10 particulate matter as it enters the waste gas inlet. In one embodiment, the incoming particulate-containing gas stream has a concentration of at least 0.3 mg/m$^3$ of PM2.5 particulate matter as it enters the waste gas inlet. Due to, at least in part, the liquid droplet sizes, the scrubbers may be able to achieve at least 50 wt. % removal of PM10 and/or PM2.5 particulate matter from the particulate-containing gas stream, as described in further detail below. The scrubbers may also achieve low pressure drop and/or low L/G values, among others, as described below.

Similarly, methods of removing PM10 and/or PM2.5 particulate matter from a particulate-containing gas stream are disclosed. In one approach, a method includes the steps of (i) directing a particulate-containing gas stream into a horizontally disposed housing via a waste gas inlet, (ii) passing the gas stream through a substantially unrestricted particulate-liquid contacting zone of the housing (described below), (iii) supplying a liquid to the plurality of nozzles via the liquid inlet manifold, thereby spraying liquid droplets through the substantially unrestricted particulate-liquid contacting zone and co-current to the flow of the gas stream, wherein the liquid droplets have a volume median droplet diameter of from 240 microns to 600 microns, and (iv) contacting at least some of the particulate matter with at least some of the liquid droplets, thereby removing at least 50 wt. % of the PM10 and/or PM2.5 particulate matter from the gas stream. In one embodiment, the incoming particulate-containing gas stream has a concentration of at least 0.7 mg/m3 of PM10 particulate matter as it enters the waste gas inlet. In one embodiment, the incoming particulate-containing gas stream has a concentration of at least 0.3 mg/m3 of PM2.5 particulate matter as it enters the waste gas inlet. The methods may also achieve low pressure drop and/or low L/G values, among others, as described below. The horizontally disposed housing may include the waste gas inlet at one end, a treated gas outlet at an opposite end, a liquid inlet manifold proximal the waste gas inlet, the liquid inlet manifold comprising a plurality of nozzles, wherein the nozzles are oriented to spray liquid droplets co-current to the gas stream, and a demister proximal the treated gas outlet, wherein the horizontally disposed housing is substantially free of flow deflection members between the liquid inlet manifold and the demister, thereby defining a substantially unrestricted particulate-liquid contacting zone between the liquid inlet manifold and the demister, These and other aspects and advantages, and novel features of this new technology are set forth in part in the description that follows and will become apparent to those skilled in the art upon examination of the following description and figures, or may be learned by practicing one or more embodiments of the technology provided for by the present disclosure.

BRIEF DESCRIPTION OF THE DRAWINGS

FIG. 4 is chart illustrating various data of the Example.

DETAILED DESCRIPTION

Figure 1:
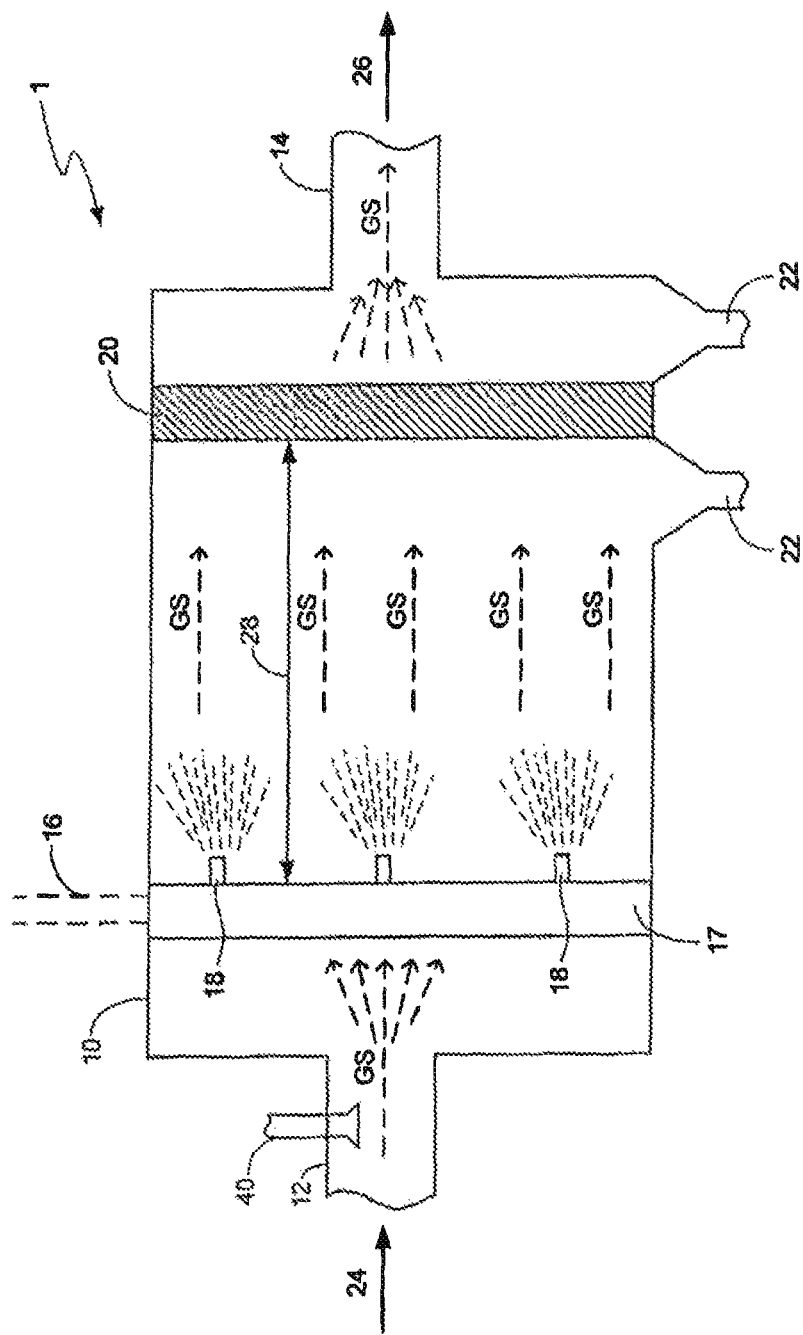
FIG. 1 is a schematic view of one embodiment of a horizontal particulate matter scrubbing system.
Figure 2:
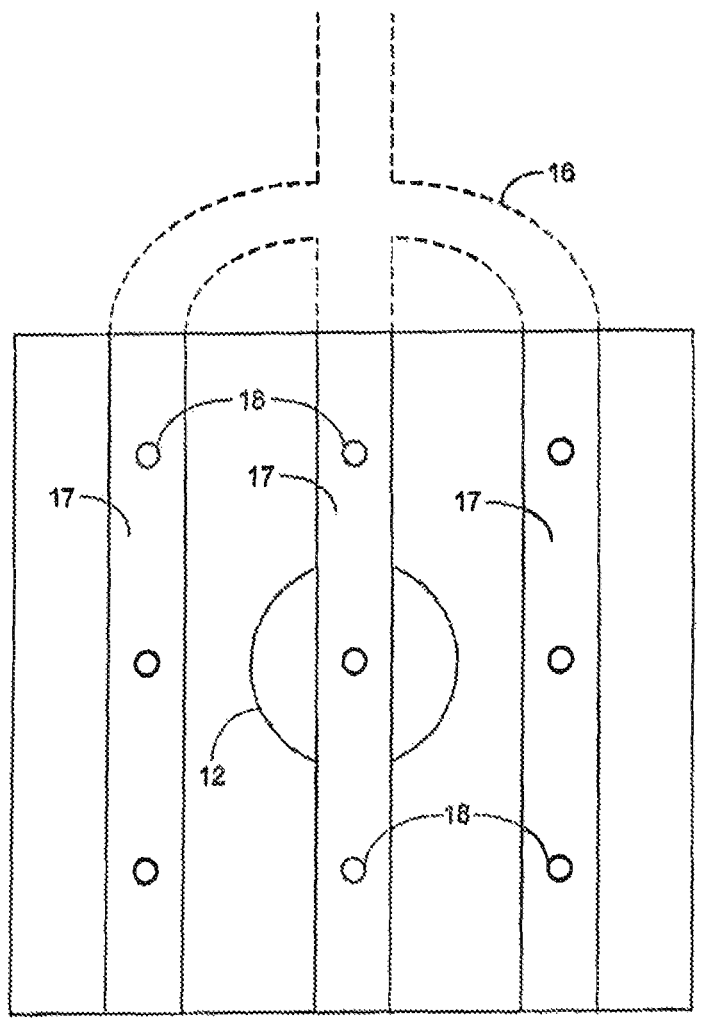
FIG. 2 is a partial cut-away view of the horizontal particulate matter scrubbing system of FIG. 1 as viewed looking down the housing toward the gas inlet.

Reference will now be made in detail to the accompanying drawings, which at least assist in illustrating various pertinent embodiments of the new technology provided for by the present disclosure. Referring now to FIGS. 1 and 2, one embodiment of a horizontal particulate matter scrubbing system is illustrated. In the illustrated embodiment, the horizontal particulate matter scrubbing system 1 includes a horizontally disposed housing 10 comprising a waste gas inlet 12 for receiving a particulate-containing gas stream 24, and a treated gas outlet 14 for discharging a treated gas stream 26. In the illustrated embodiment, a gas stream GS flows from the waste gas inlet 12, through the horizontally disposed housing 10, and exits via the treated gas outlet 14. The horizontally disposed housing 10 further comprises a liquid inlet manifold 16 downstream of the waste gas inlet 12. The liquid inlet manifold 16 comprises at least one inlet lance 17, each inlet lance 17 being at least partially hollow to facilitate liquid flow therethrough. Each inlet lance has at least one nozzle 18 coupled thereto, and sometimes a plurality of nozzles 18 ("nozzle(s)") coupled thereto. The plurality of nozzle(s) 18 are oriented within the horizontally disposed housing 10 so as to facilitate spraying of liquid droplets co-current to the flow of the gas stream GS. In this regard, the nozzle(s) 18 are fluidly interconnected to a liquid supply (not illustrated) via the inlet lances 17 of the liquid inlet manifold 16. The horizontally disposed housing 10 further includes a demister 20 downstream of the liquid inlet manifold 16. The demister 20 is adapted to remove liquid droplets from the gas stream GS before the gas stream GS exits the horizontally disposed housing 10 as treated gas stream 26 via the treated gas outlet 14. The removed liquid exits the horizontally disposed housing 10 via liquid outlets 22.

The horizontally disposed housing 10 is substantially free of flow deflection members between the liquid inlet manifold 16 and the demister 20, thereby defining a substantially unrestricted particulate-liquid contacting zone 28. As described below, when appropriate liquid droplets are used, substantial removal of particulate matter from the gas stream GS may be facilitated, and in the absence of flow deflection members.

As used herein, "particulate matter" means solid particles having a diameter of from 0.1 micron to 30 microns. This particulate matter may be any type of solid material that may be removed from a gas stream, such as soot or mineral dust in the waste gas stream of an aluminum smelting facility, industrial steam boilers, or a steel manufacturing facility, among other types of particulate matter. Particulate matter may be removed from the gas stream GS, for example, via liquid encapsulation of the particles and/or agglomeration of the particles, causing them to drop out of the gas stream, such as by gravity. Thus, the particulate matter may contact one or more liquid droplets in the particulate-liquid contacting zone 28.

Liquid droplets suitable for removing particulate matter from the gas stream GS include liquid droplets having a volume median droplet diameter of from 240 microns to 600 microns. Droplet size may be function of nozzle type, pressure of the liquid being supplied to the nozzle(s) 18, flow rate of the liquid being supplied to the nozzle(s) 18, and temperature of the liquid being supplied to the nozzle(s) 18, among other things. Nozzles suitable for producing such liquid droplets include models TF16, TF20, and TF24 nozzles (BETE Fog Nozzle, Inc., 50 Greenfield Street, Greenfield, Mass. 01301), and nozzles available from Nels Consulting Services, Inc., 40 Neilson Ave, St. Catharines, Ontario, L2M-7M9, Canada, among others.

As used herein, "droplet diameter" is the diameter of a liquid sphere having a volume equal to the volume of the droplet. A droplet may not be perfectly spherical, but, for purposes of this patent application, droplets will be described in terms of spheres with which the droplets share at least one property. Droplet diameter is measured at the point of ejection of the nozzle that produced the droplet. Droplet diameter may be ascertained by, for example, data supplied by the manufacturer, or measurement via high speed photography in combination with image processing, among others.

"DV0.X" is a droplet diameter wherein a "0.X" fraction of the total liquid volume of a liquid is comprised of droplets having droplet diameters smaller than or equal to the stated value. For example, "DV0.9" is the droplet diameter when 9/10 (nine-tenths) of the total liquid volume of the liquid (i.e. 90 vol. %) is comprised of droplets having droplet diameters smaller than or equal to a stated value. As an example, in the equation DV0.9=500 μm, 90 vol. % of the liquid is comprised of droplets having a droplet diameter smaller than or equal to 500 microns.

"Volume median droplet diameter," also sometimes called "DV0.5" herein, is the droplet diameter when ½ (one-half) of the total liquid volume of the liquid (i.e. 50 vol. %) is comprised of droplets having droplet diameters smaller than or equal to the stated value. As an example, in the equation DV0.5=400 μm, 50 vol. % of the liquid is comprised of droplets having a droplet diameter smaller than or equal to 400 microns.

As noted above, the liquid droplets may have a volume median droplet diameter of from 240 microns to 600 microns, depending on the size of the particulate matter. In one embodiment, the liquid droplets produced by the nozzle(s) 18 may have a volume median droplet diameter of not greater than 575 microns. In other embodiments, the liquid droplets may have a volume median droplet diameter of not greater than 550 microns, or not greater than 525 microns, or not greater than 500 microns, or not greater than 475 microns, or not greater than 450 microns, or less. In one embodiment, the liquid droplets may have a volume median droplet diameter of at least 250 microns. In other embodiments, the liquid droplets may have a volume median droplet diameter of at least 260 microns, or at least 270 microns, or at least 280 microns, or at least 290 microns, or at least 300 microns, or more, depending on particulate matter size.

In one embodiment, the liquid droplets may have a DV0.9 of not greater than 950 microns. In other embodiments, the liquid droplets may have a DV0.9 of not greater than 850 microns, or not greater than 750 microns, or not greater than 650 microns, or not greater than 550 microns, or not greater than 450 microns, or less.

In one embodiment, the liquid droplets may have a DV0.1 of at least 100 microns. In other embodiments, the liquid droplets may have a DV0.1 of at least 120 microns, or at least 140 microns, or at least 160 microns, or at least 180 microns, or at least 200 microns, or more.

As noted above, the liquid droplets facilitate removal of particulate matter from the gas stream GS. In one embodiment, at least 50 wt. % of PM10 particulate matter is removed. As used herein, "PM10 particulate matter" means particulate matter having an aerodynamic diameter less than or equal to a nominal 10 microns (micrometers) as defined by 40 CFR §53.1 (Oct. 17, 2006). In other embodiments, at least 60 wt. % of PM10, or at least 70 wt. % of PM10 particulate matter, or at least 80 wt. % of PM10 particulate matter, or at least 90 wt. % of PM10 particulate matter, or more, is removed from the gas stream GS.

In one embodiment, at least 50 wt. % of PM2.5 particulate matter is removed. As used herein, "PM2.5 particulate matter" means particulate matter having an aerodynamic diameter less than or equal to a nominal 2.5 microns (micrometers) as defined by 40 CFR §53.1 (Oct. 17, 2006). In other embodiments, at least 60 wt. % of PM2.5 particulate matter, or at least 70 wt. % of PM2.5 particulate matter, or more, is removed from the gas stream GS.

The concentration of PM10 and/or PM2.5 particulate matter in the particulate-containing gas stream 24 may be related to the performance of the system 1. In one embodiment, the concentration of PM10 in the particulate-containing gas stream 24 is at least 0.3 mg/m³. In other embodiments, the concentration of PM2.5 in the particulate-containing gas stream 24 is at least 0.5 mg/m³, or at least 0.7 mg/m³, or at least 0.9 mg/m³, or at least 1.1 mg/m³, or more.

In one embodiment, the concentration of PM2.5 in the particulate-containing gas stream 24 is at least 0.1 mg/m³. In other embodiments, the concentration of PM2.5 in the particulate-containing gas stream 24 is at least 0.2 mg/m$^3$, or at least 0.3 mg/m$^3$, or at least 0.4 mg/m$^3$, or at least 0.5 mg/m$^3$, or at least 0.6 mg/m$^3$, or at least 0.7 mg/m$^3$, or at least 0.8 mg/m$^3$, or at least 0.9 mg/m$^3$, or at least 1.0 mg/m$^3$, or at least 1.1 mg/m$^3$, or more.

Particulate matter removal efficiency may be related to the average velocity of the gas stream GS. Average velocity of the gas stream GS is measured proximal the waste gas inlet 12 and upstream of the liquid inlet manifold 16. Average velocity is determined using Method 2 of 40 CFR §60 APPENDIX A (Jul. 1, 2011). Gas stream velocities suitable for removing particulate matter from the gas stream include average velocities of from 15 feet per second (fps) to 40 fps. In one embodiment, the gas stream may have an average velocity of not greater than 38 fps. In other embodiments, the gas stream may have an average velocity of not greater than 36, or not greater than 34 fps, or not greater than 32 fps, or not greater than 30 fps, or less. In one embodiment, the gas stream may have an average velocity of at least 17 fps. In other embodiments, the gas stream may have an average velocity of at least 19 fps, or at least 21 fps, or at least 23 fps, or at least 25 fps, or more.

The substantially unrestricted particulate-liquid contacting zone 28 may facilitate low pressure drop across the horizontally disposed housing 10. In one embodiment, the pressure drop may be not greater than 4 inches of H$_2$O. In other embodiments, the pressure drop is not greater than 3.5 inches of H$_2$O, or not greater than 3.0 inches of H$_2$O, or not greater than 2.5 inches of H$_2$O, or not greater than 2.0 inches of H$_2$O or not greater than 1.5 inches of H$_2$O.

As noted, droplet size may be related to the pressure of the liquid being supplied to the nozzle(s) 18. The pressure of the liquid being supplied to the nozzles ("liquid pressure') is measured within the liquid inlet manifold and proximal the inlet to the nozzle(s) 18. Suitable liquid droplets may be produced using liquid pressures of from 30 psig to 80 psig. In one embodiment, the liquid pressure is not greater than 75 psig. In other embodiments, the liquid pressure is not greater than 70 psig, or not greater than 65 psig, or less. In one embodiment, the liquid pressure is at least 35 psig. In other embodiments, the liquid pressure is at least 40 psig, or at least 45 psig, or at least 50 psig, or more.

The nozzle(s) 18 are operable to inject liquid droplets into the housing 10 co-current to the gas stream GS. Thus, the nozzle(s) 18 are generally configured with their ejection end disposed towards the demister 20. The nozzle(s) 18 are generally operable to produce the liquid droplets from the liquid. The nozzle(s) 18 may be adapted to spray the liquid droplets in any suitable spray pattern within the housing. It is generally desirable for the nozzle(s) 18 to produce a spray pattern that substantially covers a cross-sectional area of the horizontally disposed housing 10. Thus, the nozzle(s) 18 may employ a full cone spray pattern, a hollow cone spray pattern, or any combination thereof. In one embodiment, the nozzle(s) 18 employ a hollow cone spray pattern.

The relative distance between each of the nozzle(s) 18 may be tailored so that the spray pattern from one nozzle overlaps with the spray pattern of one or more adjacent nozzle(s) 18. Hence, the spray pattern may substantially cover the cross-sectional area of the horizontally disposed housing 10. The momentum of the liquid droplets in the spray pattern may be tailored so that appreciable amounts of the liquid droplets remain airborne across a substantial length of the particulate-liquid contacting zone 28. Thus, the spray pattern may substantially cover the cross-sectional area of the horizontally disposed housing 10 and over a substantial length of the particulate-liquid contacting zone 28, thereby providing intimate contact between the particulate matter and the liquid droplets in the particulate-liquid contacting zone 28. Such intimate contact may facilitate liquid encapsulation of the individual particles of the particulate matter and/or agglomeration of the particles. In turn, high particulate matter removal rates may be realized.

Any number of nozzle(s) 18 with any number of spray patterns and/or DV0.5 droplet size capability (among others), and in any combination may be utilized with the liquid inlet manifold 16 to facilitate production of appropriate liquid droplet sizes and coverage of the cross-sectional area of the horizontally disposed housing 10. By way of primary illustration, the nozzle(s) 18 may all comprise the same droplet capability (e.g., the same spray pattern capability, momentum production capability, and/or DV0.5 droplet size capability). By way of secondary illustration, a first set of nozzle(s) may comprise a first droplet capability (e.g., a first spray pattern, a first momentum production capability and/or a DV0.5 first droplet size capability), and a second set of nozzle(s) may comprise a second droplet capability (e.g., a second spray pattern, a second momentum production capability and/or a second DV0.5 droplet size capability). In turn, other additional nozzle sets (e.g., third, fourth, etc.) may be utilized. Furthermore, any number of nozzles may be utilized per lance 17 of the liquid inlet manifold 16. In the illustrated embodiment, three nozzles 18 per lance 17 of the liquid inlet manifold 16 are utilized. However, other configurations may be utilized. Furthermore, adjacent nozzle(s) 18 may be similarly oriented in the up, down and/or side-to-side directions (e.g., sharing the same vertical and/or horizontal plane), as illustrated, or adjacent nozzle(s) 18 may be offset relative to one or more other nozzle(s) 18.

In general, the nozzle(s) 18 should be arranged to lower or restrict the amount of liquid droplets that contact the walls of the housing 10. In this regard, the housing 10 and/or nozzle(s) 18 should generally be sized to lower or restrict the amount of liquid droplets contacting its walls. In any event, the cross-sectional area should not be so large that the footprint of the housing 10 is excessive.

As noted, the horizontally disposed housing 10 is substantially free of flow deflection members between the liquid inlet manifold 16 and demister 20, which defines a substantially unrestricted particulate-liquid contacting zone 28. The length of the particulate-liquid contacting zone 28 is application dependent, and may be a function of, for example, the flow rate of the gas stream GS through the housing, the particulate matter concentration in the particulate-containing gas stream 24, and/or the cross-sectional area of the housing 10, to name a few. Generally, the length of the particulate-liquid contacting zone 28 should be long enough to facilitate sufficient interaction between the particulate matter and the liquid droplets so that suitable particulate matter removal rates are facilitated (e.g., removal of at least about 50 wt. % PM10 particulate matter), but with restricted pressure drop.

The demister 20 may be any suitable liquid removal apparatus capable of removing at least 90 wt. % of the liquid droplets from the gas stream GS. In some embodiments, the demister may remove at least 92 wt. %, or at least 94 wt. %, or at least 96 wt. %, or at least 98 wt. %, or at least 99 wt. % of the liquid droplets in the gas stream GS. Optionally, the demister 20 may include a plurality of demisters (e.g., a first demister and a second demister downstream of the first demister).

The above PM10 particulate matter and/or PM2.5 particulate matter removal rates may be achieved with relatively small L/G ratios. As used herein, L/G means the average gallons per minute of liquid flow ("L") into the liquid inlet manifold 16, as measured proximal the inlet to the liquid inlet manifold 16, per 1000 actual cubic feet per minute (ACFM) of water saturated gas stream flow of the gas stream (G"). "G" may be measured directly or may be calculated, for example, by measuring the total flow rate of the gas stream proximal the waste gas inlet 12 and adjusting for evaporation of water and temperature reduction. In one embodiment, the L/G ratio is not greater than 20. In other embodiments, the L/G ratio is not greater than 18, or not greater than 16, or not greater than 14, or not greater than 12.

Figure 3:
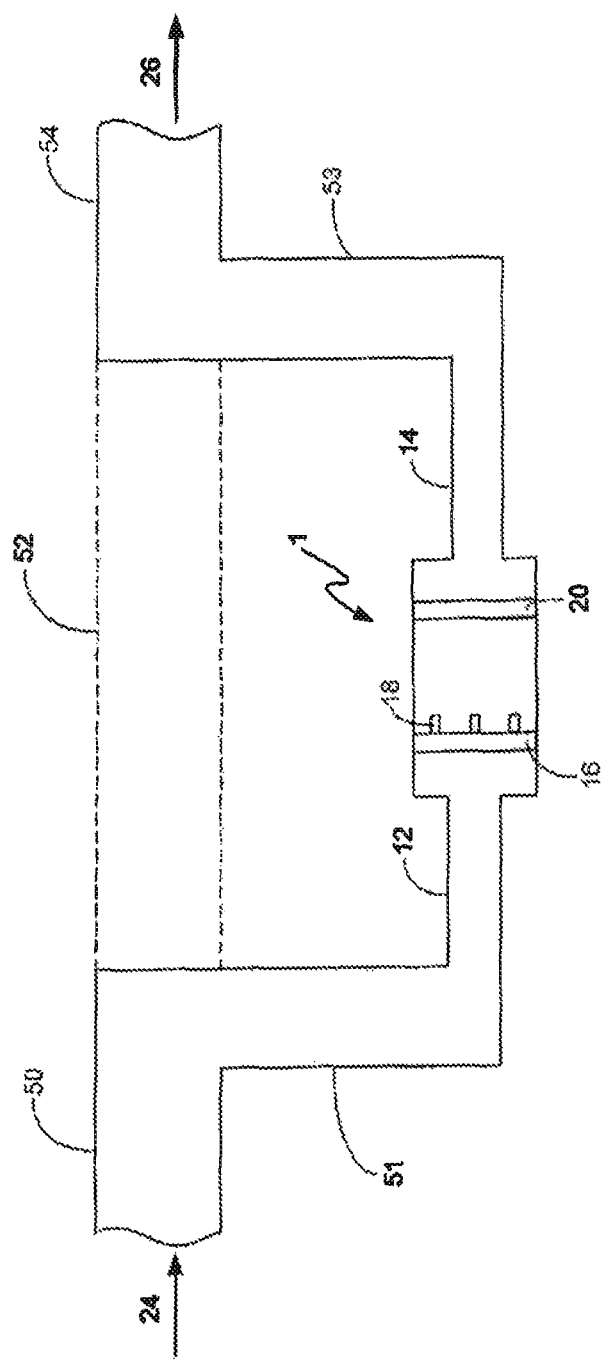
FIG. 3 is a schematic illustration of one embodiment of an in-duct horizontal particulate matter scrubbing system.

The horizontal particulate matter scrubbing system 1 may be utilized in a variety of applications. In one embodiment, the horizontal particulate matter scrubbing system 1 is employed in an in-duct setting, where the waste gas inlet 12 and treated gas outlet are directly interconnected to a waste gas duct of an industrial facility. One embodiment of such a configuration is illustrated in FIG. 3. In the illustrated embodiment, a particulate-containing gas stream 24 from an industrial facility (not illustrated) exits such industrial facility via ductwork 50. The horizontal particulate matter scrubbing system 1 is fluidly interconnected to the ductwork 50 via piping 51 and gas inlet 12. As described above, such particulate-containing gas stream 24 may be treated via the horizontal particulate matter scrubbing system 1, and treated gas 26 may be exhausted via the treated gas outlet 14. In this regard, the system 1 may include one or more transition zones (described above) to obtain suitable gas stream flow rates and/or may include suitable demisters. In turn, the treated gas outlet 14 may be fluidly interconnected with exhaust ductwork 54 via piping 53. Such treated gas 26 may be exhausted to the atmosphere. Hence, in one embodiment, ductwork 50 and exhaust ductwork 54 are preexisting prior to installation of the horizontal particulate matter scrubbing system 1, and a channel 52 interconnecting ductwork 50 and exhaust ductwork 54 may be removed to facilitate incorporation of the horizontal particulate matter scrubbing system 1. Thus, in some embodiments, the horizontal particulate matter scrubbing system 1 may be added to existing facilities with relatively minor adjustments to existing waste gas treatment systems. In other embodiments, the horizontal particulate matter scrubbing system is used in non-retrofit applications, such as newly constructed particulate matter scrubbers.

The temperature and humidity of the incoming particulate-containing gas stream 24 may affect the performance of the system 1. In one embodiment, a cooling water spray upstream of the liquid inlet manifold 16 is used to at least partially humidify and/or cool the particulate-containing gas stream 24, sometimes referred to herein as pre-humidification. For example, and with reference to FIG. 1, the horizontal particulate matter scrubbing system 1 may optionally comprise a cooling spray 40 disposed upstream of the liquid inlet manifold 16 for spraying water (or other suitable cooling medium) into the entering particulate-containing gas stream 24 for cooling such particulate-containing gas stream 24. The cooling spray 40 may spray cooling water in a countercurrent or co-current fashion relative to the particulate-containing gas stream 24 to facilitate such cooling. The volumetric flow rate of such cooling liquid spray is generally application dependent. In some embodiments, using pre-humidification may allow the system 1 to operate at lower L/G ratios while still achieving suitable particulate matter removal rates.

EXAMPLE

A horizontal particulate matter scrubbing system similar to the one illustrated in FIG. 1 was produced. A particulate-containing gas stream was introduced into the scrubbing system (the gas stream had a temperature of about 250° F.). The particulate matter type was MICROTALC having the following size distribution properties:

D10 (volume basis)=1.69 microns
D50 (volume basis)=4.89 microns
D90 (volume basis)=10.38 microns
19.0 vol. %≤2.5 microns
88.5 vol. %≤10 microns The gas stream velocity, inlet gas particulate matter concentration, and volume median droplet diameter (DV0.5) were varied. The average velocity of the gas stream was measured using an S type pitot tube. The temperature of the gas stream was measured using a plurality of K type thermocouples. The liquid pressure was measured using an oil-filled bourdon tube pressure gauge. As illustrated in FIG. 4, in each run, the system achieved at least 87% PM10 removal efficiency. Furthermore, in the two runs in which PM2.5 removal rate data was collected (Runs A and B), the system achieved at least 63% PM2.5 removal efficiency.

While various embodiments of the new technology described herein have been described in detail, it is apparent that modifications and adaptations of those embodiments will occur to those skilled in the art. However, it is to be expressly understood that such modifications and adaptations are within the spirit and scope of the presently disclosed technology.

What is claimed is:

1. A method comprising:
 (a) directing a particulate-containing gas stream having a concentration of at least 0.3 mg/m³ of PM2.5 particulate matter into a horizontally disposed housing via a waste gas inlet, the horizontally disposed housing comprising:
 (i) the waste gas inlet at one end;
 (ii) a treated gas outlet at an opposite end;
 (iii) a liquid inlet manifold proximal the waste gas inlet, the liquid inlet manifold comprising a plurality of nozzles, wherein the nozzles are oriented to spray liquid droplets co-current to the gas stream;
 (iv) and a demister proximal the treated gas outlet;
 wherein the horizontally disposed housing is substantially free of flow deflection members between the liquid inlet manifold and the demister, thereby defining a substantially unrestricted particulate-liquid contacting zone between the liquid inlet manifold and the demister;
 (b) passing the gas stream through the substantially unrestricted particulate-liquid contacting zone;
 (c) supplying a liquid to the plurality of nozzles via the liquid inlet manifold, thereby spraying liquid droplets through the substantially unrestricted particulate-liquid contacting zone and co-current to the flow of the gas stream, wherein the liquid droplets have a volume median droplet diameter (DV0.5) of from 240 microns to 600 microns;
 (d) contacting at least some of the PM2.5 particulate matter with at least some of the liquid droplets, thereby removing at least 50 wt. % of the PM2.5 particulate matter from the gas stream.

2. The method of claim 1, wherein the supplying step (c) comprises supplying the liquid to the plurality of nozzles at a pressure of from 30 psig to 80 psig.

3. The method of claim 1, wherein the directing step (a) comprises directing the particulate-containing gas stream into the waste gas inlet at an average velocity of from 15 fps to 40 fps.

4. The method of claim 1, wherein the contacting step comprises removing at least 60 wt. % of the PM2.5 particulate matter from the gas stream.

5. The method of claim 1, wherein the contacting step (d) comprises removing at least 70 wt. % of the PM2.5 particulate matter from the gas stream.

6. The method of claim 1, wherein the particulate-containing gas stream has a concentration of at least 0.7 mg/m$^3$ of PM10 particulate matter as it enters the waste gas inlet.

7. The method of claim 6, wherein the contacting step (d) comprises removing at least 60 wt, % of the PM10 particulate matter from the gas stream.

8. The method of claim 6, wherein the contacting step (d) comprises removing at least 70 wt. % of the PM10 particulate matter from the gas stream.

9. The method of claim 6, wherein the contacting step (d) comprises removing at least 80 wt. % of the PM10 particulate matter from the gas stream.

10. The method of claim 1, wherein the liquid droplets have a volume median droplet diameter (DV0.5) of not greater than 550 microns.

11. The method of claim 1, wherein the liquid droplets have a volume median droplet diameter (DV0.5) of not greater than 525 microns.

12. The method of claim 1, wherein the liquid droplets have a volume median droplet diameter (DV0.5) of not greater than 500 microns.

13. The method of claim 1, wherein the liquid droplets have a volume median droplet diameter (DV0.5) of not greater than 475 microns.

14. The method of claim 1, wherein the liquid droplets have a volume median droplet diameter (DV0.5) of not greater than 450 microns.

15. The method of claim 1, wherein the liquid droplets have a volume median droplet diameter (DV0.5) of at least 250 microns.

16. The method of claim 1, wherein the liquid droplets have a volume median droplet diameter (DV0.5) of at least 260 microns.

17. The method of claim 1, wherein the liquid droplets have a volume median droplet diameter (DV0.5) of at least 270 microns.

18. The method of claim 1, wherein the liquid droplets have a volume median droplet diameter (DV0.5) of at least 280 microns.

19. The method of claim 1, wherein the liquid droplets have a volume median droplet diameter (DV0.5) of at least 290 microns.

20. The method of claim 1, wherein the liquid droplets have a volume median droplet diameter (DV0.5) of at least 300 microns.

\* \* \* \* \*